United States Patent Office 2,812,095
Patented Nov. 5, 1957

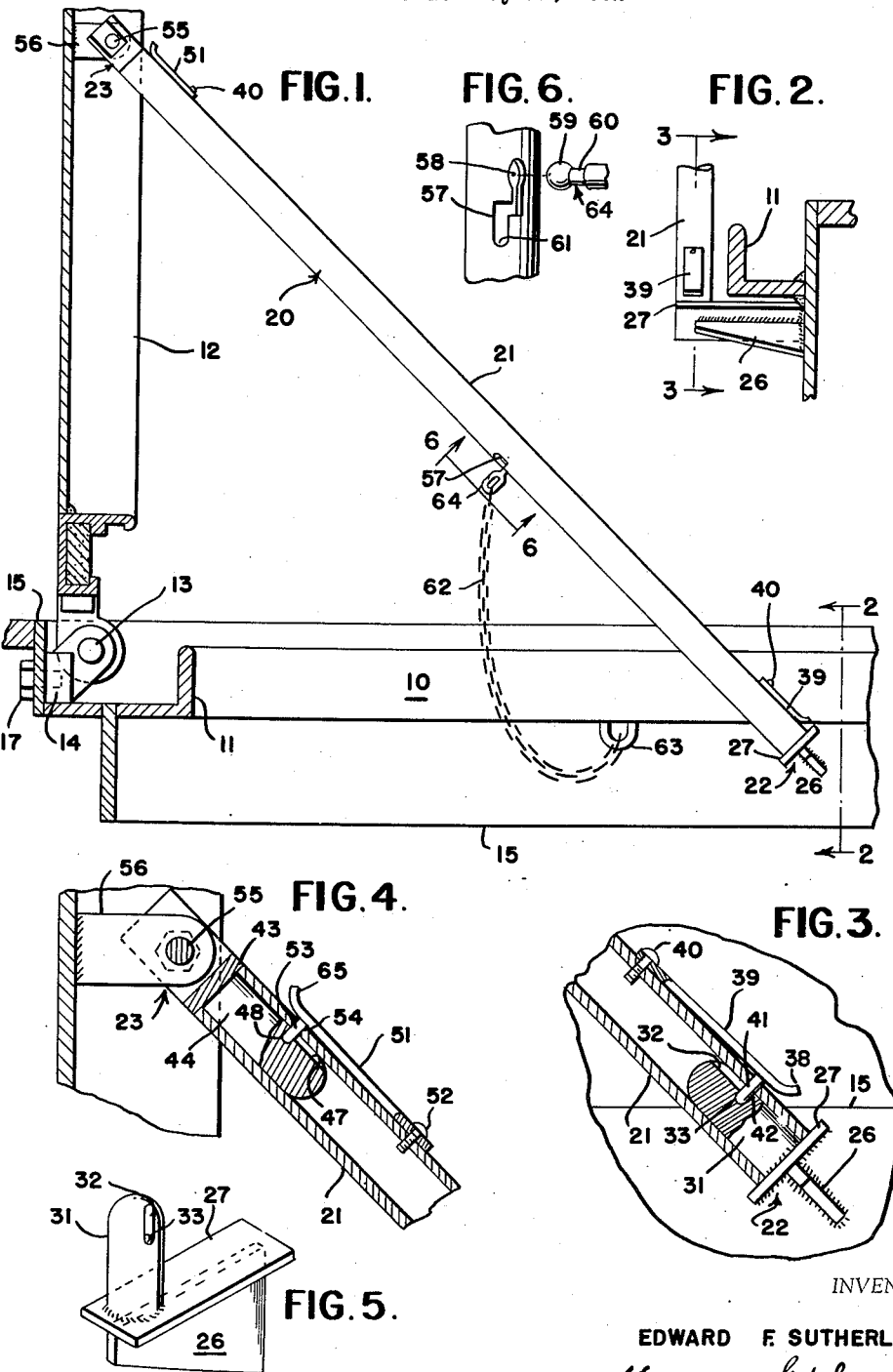

2,812,095

HATCH BRACE

Edward F. Sutherland, Chicora, Pa.

Application May 22, 1952, Serial No. 289,416

2 Claims. (Cl. 217—60)

(Granted under Title 35, U. S. Code (1952), sec. 266)

The invention described herein may be manufactured and used by or for the Government of the United States of America for governmental purposes without the payment of any royalties thereon or therefor.

The present invention relates to a means for holding or bracing a hatch cover in an open position, and more particularly to a brace to be inserted between a hatch cover and the deck for holding the hatch cover open.

In the past, hatch braces were set in place by the use of toggle pins, shackles, etc. Such arrangements involved lifting the hatch cover to an open position, setting the hatch brace in position and inserting toggle pins in the latch means provided. When the brace was removed, the reverse operation was involved. It was often exceedingly difficult to insert or remove the toggle pins since considerable rusting and erosion of parts had taken place. Since it is very often necessary to open or close a hatch cover within a very short period of time, a more efficient arrangement is desirable.

The present invention provides a more efficient brace which can be very quickly set into place, and which does not require the use of toggle pins. The brace includes a hollow pipe member into the ends of which are fitted end members. One end member is carried by the hatch structure and the other end member is carried by the hatch cover. Suitable latch means are provided on each end of the pipe so that the brace may be quickly and easily set into place or removed.

Accordingly it is an object of the present invention to provide a hatch brace of generally simplified construction.

Another object is to provide a hatch brace eliminating the use of toggle pins to secure it into place.

A further object of the invention is the provision of a hatch brace involving the use of leaf springs to hold it in place in such a manner that the brace may be easily and quickly removed from its set position.

Other objects and many of the attendant advantages of this invention will be readily appreciated as the same becomes better understood by reference to the following detailed description when considered in connection with the accompanying drawing in which like reference numerals designate like parts throughout the figures thereof, and wherein:

Fig. 1 is a vertical sectional view of an open hatch structure in which a brace embodying the present invention is shown as holding the hatch in open condition;

Fig. 2 is a cross-sectional elevation, taken on the line 2—2 of Fig. 1, and looking in the direction of the arrows;

Fig. 3 is an enlarged cross-sectional elevation, taken on line 3—3 of Fig. 2;

Fig. 4 is an enlargement similar to Fig. 3 illustrating another detail of the brace of the present invention;

Fig. 5 is a perspective of a detail appearing in Fig. 3; and

Fig. 6 is a diagrammatic side view, taken along the line 6—6 of Fig. 1 and looking in the direction of the arrows.

The brace of the present invention is useful for holding a hatch in open condition, and may be used with any conventional hatch, comprising a hatch opening defined by the frame 10, which usually embodies a hatch seat 11 against which the hatch closure or cover 12 bears to close the hatch opening. Closure 12 is adapted to swing or pivot on an axis proximate to one of its edges, and for the purpose is mounted on pin 13, journaled in bearing 14, which is secured to the hatch opening structure 15 by means of bolts 17. Closure 12 pivots or swings on pin 13 alternatively in opposite directions to the open position seen in Fig. 1, or to closed position of closure 12 bearing against seat 11.

Structure described up to now is well known prior-art practice. The present invention constitutes a brace that holds the hatch in open condition as seen in Fig. 1, the brace being indicated generally at 20.

Brace 20 comprises the stay rod 21, for which there is the attachment 22 at its free end, and the attachment 23 at its captive end. The several attachments 22 and 23 are secured to the hatch closure 12 and opening structure 15 severally. In the disclosed embodiment, the attachment 23 of the captive end of rod 21 is secured to closure 12, and the stay rod 21 may be used as a handle for opening and closing the hatch. Accordingly, attachment 22 is secured to the structure of the hatch opening 15 that includes the frame 10, and is positioned to engage the stay rod 21 at its free end when the hatch is open.

Attachment 22 for the free end of stay rod 21 preferably is secured rigidly to the hatch opening structure 15, as seen in Fig. 3, and comprises bracket 26 and transverse plate 27, which are secured to each other and also to structure 15, by welding for example. Transverse plate 27 carries insert pin 31 secured thereto by welding. See Fig. 5. Insert pin 31 projects away from the face of plate 27 perpendicularly, and points towards the attachment 23 when the hatch is open.

Stay rod 21 swings on pivot 55, the axis of which is paralleled with the axis of pivot 13 on which closure 12 swings. Stay rod 21 is located to swing in a plane that includes insert pin 31, and is movable into and out of alignment with the insert pin. By actuating stay rod 21 lengthwise towards transverse plate 27, pin 31 is projected into an end socket that extends from the end face of the stay rod lengthwise. The socket is formed by the stay rod being a length of pipe, and the insert pin is made to fit in the pipe. The end face of pipe 21 abuts against the face of plate 27, whereby the closure 21 is held firmly in open position.

Insert pin 31 comprises the lengthwise groove 32, which is milled out along one face thereof. The groove 32 ends in deeper recess 33.

Leaf spring 39 is secured to pipe 21 near its free end by means of screw 40, and carries the detent or lug 41, which projects through hole 42 near the end of the pipe 21. As is seen in Fig. 3, detent 41 and its corresponding hole 42 are located lengthwise of pipe 21 in position for the detent to seat in recess 33 when the end face of pipe 21 abuts against transverse plate 27. Stay rod 21 thereby is steadied firmly when it holds closure 12 in open position of Fig. 1.

Spring 39 is bent upwardly at its end 38 to provide a finger grip for lifting detent out of recess 33 for releasing stay rod 21 from its attachment 22 when the hatch closure 12 is closed.

Stay rod 21 in the disclosed embodiment is also detachable from its attachment 23 at its captive end, enabling the stay rod to be removed completely from the hatch. Accordingly, as is best illustrated in Fig. 4, attachment 23 comprises a bracket 43 to which insert pin 44 is welded. Bracket 56 is secured to closure 12, by welding for example, and carries pivot pin 55 on which the bracket 43 swings. The position of bracket 56 along closure 12 is away from the closure pivot 13, and bracket 56 is spaced away from pivot 13 at least a sufficient distance for the amount of leverage required to actuate the closure into and out of closed position manually, by means of brace 20 being used as a handle. The position of bracket 26 along hatch opening 10 with reference to pivot 13 is determined by the length of brace 20, with reference to the distance between brackets 56 and 26, when the closure is in the open position of Fig. 1, and the free end of stay rod 21 is engaged and held by attachment 22.

Pipe 21 comprises a socket at its captive end also, into which insert pin 44 fits in the manner of pin 31 at the free end. A lengthwise groove 47 is milled along one face of insert pin 44, and terminates in deeper recess 48. A leaf spring 51, similar to leaf spring 39, is secured to pipe 21 by means of screw 52, and carries detent or lug 53 which projects through hole 54 in the wall of pipe 21 and into the recess 48, thereby latching pipe 21 at its captive end to its corresponding end attachment 23. Spring 51 also is turned up at its end to form a finger grip 65 by means of which detent 53 is lifted out of recess 48 when it is desired to detach and remove stay rod 21 from engagement with its attachment 23 of its captive end.

To keep stay rod 21 near its corresponding hatch where it belongs, for example when it is detached from both attachments 22 and 23 at its respective free and captive end, the chain 62 is provided, and is secured at its one end to the structure 15 of the hatch opening by means of eye 63, Fig. 1, and at its other end is detachably secured to the stay rod by means of the latch member 64. Tortuous slot 57, Fig. 6, extends lengthwise of pipe 21 at a point between its ends, and terminates at its one end in the enlarged circular hole 58. Latch member 64 comprises the enlarged ball tip 59 that fits into the hole 58, and comprises the constricted shank 60 that fits in the slot 57. With ball tip 59 projected into hole 58, shank 60 can slide along slot 57 to its opposite end 61, whereby tie rod 21 is held by the keep chain 62.

Usually the stay rod 21 is secured at its captive end to its end attachment 23, by insert pin 44 being projected into the end socket of the stay rod as seen in Fig. 4.

When the hatch is closed and it is desired to open it, brace 20 is used as a handle to actuate closure 12 out of engagement with the seat 11, and the closure swings on its pivot pin 13 to the position shown in Fig. 1. Pipe 21 of the brace is then actuated towards end attachment 22 of its free end, and the end socket of the pipe is positioned over insert pin 31, as seen in Fig. 3, until the lug 41 of leaf spring 39 slides into recess 33 as shown. This locks pipe 21 firmly into engagement with the end attachment 22 of its free end. The hatch cover or closure 12 is held firmly in open position thereby and the hatch maintained in open condition.

To close the hatch, finger grip 38 is raised to disengage spring detent 39, 41 from the recess 33, and stay rod 21 is actuated lengthwise out of engagement with insert pin 31 and away from the end attachment 22. With the brace 20 now being operated as a handle, closure 12 is now actuated into closed position and into sealing engagement with the seat 11 of the hatch opening.

If desired, stay rod 21 may be disengaged from its end attachment 23 of its captive end when the hatch is in closed condition, for example to place it in some more appropriate idle position. Under preferred practice, however, latch member 64 is left in engagement with the slot 57 at its end 61 to keep stay rod 21 attached to its keep chain 62, as a warning to anyone who attempts to remove the stay rod from its hatch opening where it belongs. Latch member 64 may be disengaged readily from stay rod 21, by sliding the restricted shank 60 along slot 57 to the circular hole 58 where the ball end 59 of the latch member may be withdrawn through hole 58. This enables easy replacement of the stay rod 21, or its removal for servicing and repair.

The structure of the herein disclosure presents one practical embodiment of the invention, the scope of which is determined by the accompanying claims.

What is claimed is:

1. A hatch mounting assembly comprising a hatch mounting structure, a journal flange secured to said hatch mounting structure, a hatch cover pivotally mounted on said journal flange, a hollow pipe member releasably pivoted on said hatch cover, a T-shaped channel fixedly attached to said mounting structure and having an insert pin associated therewith, said insert pin having a flat groove along one face thereof, a recess in said insert pin axially aligned with said flat groove, said hollow pipe member having an open end adapted to fit around said insert pin, a leaf spring having one end thereof secured to said pipe member adjacent said open end, said pipe member having an aperture adjacent said open end, a lug fixed to said leaf spring for fitting through said aperture and slidably coacting with said flat groove to fall into said recess for releasably attaching said pipe member to said T-shaped channel.

2. A hatch mounting assembly comprising a hatch mounting structure, a journal flange associated with said mounting structure, a hatch cover pivotally mounted on said journal flange, an upper securing member pivotally fixed to said hatch cover at a point spaced from said journal flange, an upper insert pin secured to said upper securing member, a channel member fixedly attached to said mounting structure and having a lower insert pin secured thereto, each of said upper and lower insert pins having a flat groove along one face thereof and a recess in each of said insert pins being axially aligned with said flat groove, a hollow open ended pipe having one end surmounted on said lower insert pin and the other end fitting around said upper insert pin, said open ended pipe having a leaf spring secured adjacent each end thereof and an aperture adjacent thereto, each of said leaf springs having a lug secured thereon adapted to fit through said aperture, and each lug being further adapted to slidably coact with one of said flat grooves to fall into one of said recesses for releasably attaching said open ended pipe to said channel member and to said upper securing member.

References Cited in the file of this patent

UNITED STATES PATENTS

| | | |
|---|---|---|
| 598,405 | Williams | Feb. 1, 1898 |
| 972,544 | Lathrop | Oct. 11, 1910 |
| 1,592,356 | Goldberg et al. | July 23, 1926 |
| 1,598,868 | Lundelius | Sept. 7, 1926 |
| 1,637,655 | Prisley | Aug. 2, 1927 |
| 2,220,876 | Carter | Nov. 12, 1940 |

FOREIGN PATENTS

| | | |
|---|---|---|
| 116,206 | Great Britain | June 6, 1918 |